United States Patent
Izzat et al.

(10) Patent No.: US 8,015,474 B2
(45) Date of Patent: Sep. 6, 2011

(54) ADAPTIVE FORWARD ERROR CORRECTION

(75) Inventors: Izzat Hekmat Izzat, Fair Oaks Ranch, CA (US); Mary Lafuze Comer, Fairmount, IN (US); Thomas Anthony Stahl, Indianapolis, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 1036 days.

(21) Appl. No.: 11/792,184

(22) PCT Filed: Jun. 14, 2005

(86) PCT No.: PCT/US2005/020928
§ 371 (c)(1),
(2), (4) Date: Jun. 1, 2007

(87) PCT Pub. No.: WO2006/060036
PCT Pub. Date: Jun. 8, 2006

(65) Prior Publication Data
US 2008/0134005 A1 Jun. 5, 2008

Related U.S. Application Data

(60) Provisional application No. 60/632,489, filed on Dec. 2, 2004.

(51) Int. Cl.
*H03M 13/00* (2006.01)
(52) U.S. Cl. .......................... 714/774; 714/751
(58) Field of Classification Search .................. 714/751, 714/774
See application file for complete search history.

(56) References Cited

U.S. PATENT DOCUMENTS

| 5,600,663 A * | 2/1997 | Ayanoglu et al. ............. 714/774 |
| 5,699,365 A * | 12/1997 | Klayman et al. |
| 6,141,788 A * | 10/2000 | Rosenberg et al. ........... 714/774 |
| 6,145,109 A * | 11/2000 | Schuster et al. ............... 714/752 |
| 7,328,393 B2 * | 2/2008 | Chawla et al. ................ 714/774 |
| 7,616,658 B2 * | 11/2009 | Harada et al. ................. 370/465 |
| 7,672,265 B2 * | 3/2010 | Kwak .......................... 370/320 |
| 2002/0136162 A1 | 9/2002 | Yoshimura et al. |

(Continued)

FOREIGN PATENT DOCUMENTS
EP 1168732 1/2002
(Continued)

OTHER PUBLICATIONS

Baldantoni, L. et al.: "Adaptive End-To-End FEC for Improving TCP Performance Over Wireless Links", Jun. 20, 2004, pp. 4023-4027, XP010709869.

(Continued)

*Primary Examiner* — Sam Rizk
(74) *Attorney, Agent, or Firm* — Robert D. Shedd; Paul P. Kiel; Guy H. Eriksen

(57) ABSTRACT

There are described apparatus and methods for adaptive forward error correction (FEC), one use being for video streaming over a wireless network. The apparatus includes an FEC encoder and an adaptive FEC device. The FEC encoder is for encoding k packets of source data into n packets, where n>k, and the n packets include redundant packets. The adaptive FEC device is for adaptively determining a number of the redundant packets to transmit with the encoded k packets, based upon receiving one or more feedback messages. The one or more feedback messages indicate a condition of the wireless network over which the encoded video is to be transmitted.

25 Claims, 2 Drawing Sheets

U.S. PATENT DOCUMENTS

2002/0191594 A1    12/2002    Itoh et al.
2005/0009523 A1*    1/2005    Pekonen ................... 455/436

FOREIGN PATENT DOCUMENTS

| JP | 07-336331 | | 12/1995 |
|---|---|---|---|
| JP | 2001-045098 | | 2/2001 |
| JP | 2001-160824 | | 6/2001 |
| JP | 2001-230809 | | 8/2001 |
| JP | 2002-281078 | | 9/2002 |
| JP | 2004-289621 | | 10/2004 |
| WO | WO0049760 | * | 8/2000 |
| WO | WO 02/17574 | | 2/2002 |

OTHER PUBLICATIONS

McKinley, P.K. et al.: "An Experimental Study of Adaptive Forward Error Correction for Wireless Collaborative Computing", Jan. 8, 2001, pp. 157-166, XP010532809.

Padhye, C. et al.: "A New Adaptive FEC Loss Control Algorithm for Voice Over IP Applications", Feb. 20, 2000, pp. 307-313, XP010500039.

International Search Report, dated Oct. 11, 2005.

Patent Abstracts of Japan, JP 07-336331, published Dec. 22, 1995.

Patent Abstracts of Japan, JP 2001-160824, published Jun. 12, 2001.

Patent Abstracts of Japan, JP 2004-289621, published Oct. 14, 2004.

Nikaein, Nada at al., "-MA-FEC; a QoS-based Adaptive FEC for Multicast Communication In Wireless Networks", Communication, 2000, ICC2000, 2000 IEEE International Conference on Jun. 2000, vol. 2, pp. 954-958.

Suzuki, Hideharu at al., "Comparative Evaluations on Multicast Error Recovery Methods Over Wireless LAN", Multimedia, Distribution, Coordination and Mobile (DICOMO) Sympoalum Papers, 1997-2008, Ver.1.1 (DVD-ROM), Japan, Information Processing Society of Japan, Jun. 2003, vol. 2003, pp. 229-232. (in Japanese language); (English Translation Will Follow When Available).

* cited by examiner

ADAPTIVE FORWARD ERROR CORRECTION

CROSS-REFERENCE TO RELATED APPLICATIONS

This application claims the benefit, under 35 U.S.C. §365 of International Application PCT/US2005/020928, filed Jun. 14, 2005 which was published in accordance with PCT Article 21(2) on Jun. 8, 2006 in English and claims priority of 60/632,489 filed Dec. 2, 2004.

FIELD OF THE INVENTION

The present invention generally relates to forward error correction (FEC).

BACKGROUND OF THE INVENTION

Oftentimes, the error rate of wireless networks is not sufficient for video applications due to the possible large number of large packet losses/drops. Dropped or lost packets are sometimes not recovered, but in schemes where packet recovery is implemented, packets are recovered using retransmission or forward error correction (FEC), or a combination of both. FEC has been widely used to correct errors without requiring retransmission. FEC allows recovery of data contained in corrupted, dropped, or lost packets by transmitting redundant information, which can be used by the receiver to reconstruct missing data. FEC provides faster recovery of data than does retransmission and does not require a feedback channel. Static FEC techniques have been used by many researchers but fail to match FEC overhead with channel and network conditions.

The use of FEC in wireless networks has been an active area of research in wireless video applications. One advantage of FEC is that it works well with Multicast. Also, FEC does not require interaction with the video encoder and hence is applicable to any video coding technique, and to both stored and live video. However, static FEC algorithms can degrade performance by the mismatch between network resources and the amount of redundancy such algorithms add that consume the limited bandwidth of the wireless network.

Adaptive FEC techniques have been shown to benefit network performance. All adaptive techniques require feedback to estimate available network bandwidth and then adapt the amount of redundancy based on the feedback. The feedback may be explicit, such as Real-Time Control Protocol (RTCP) reports, or implicit, such as the use of wireless sender lower layers packet retransmission. In general, the adaptation mechanism increases the number of redundant packets to send if the network condition is poor. If the network condition is satisfactory, then no redundant packets, or only a small number of redundant packets, need to be transmitted. Most of the prior art approaches are directed to bit-level FEC.

SUMMARY OF THE INVENTION

These and other drawbacks and disadvantages of the prior art are addressed by the present invention, which is directed to adaptive forward error correction (FEC). One application for the adaptive FEC of the present invention is for video streaming over wireless networks.

According to an aspect of the present invention, there is provided an apparatus for adaptive FEC. The apparatus includes an FEC encoder and an adaptive FEC device. The FEC encoder is for encoding k packets of source data into n packets, where n>k, and the n packets include redundant packets. The adaptive FEC device is for adaptively determining a number of the redundant packets to transmit with the encoded k packets, based at least one feedback message. The at least one feedback message may indicate the condition or status of the network over which the FEC encoded packets are to be transmitted.

These and other aspects, features and advantages of the present invention will become apparent from the following detailed description of exemplary embodiments, which is to be read in connection with the accompanying drawings.

BRIEF DESCRIPTION OF THE DRAWINGS

The present invention may be better understood in accordance with the following exemplary figures, in which.

DETAILED DESCRIPTION

Figure 1:
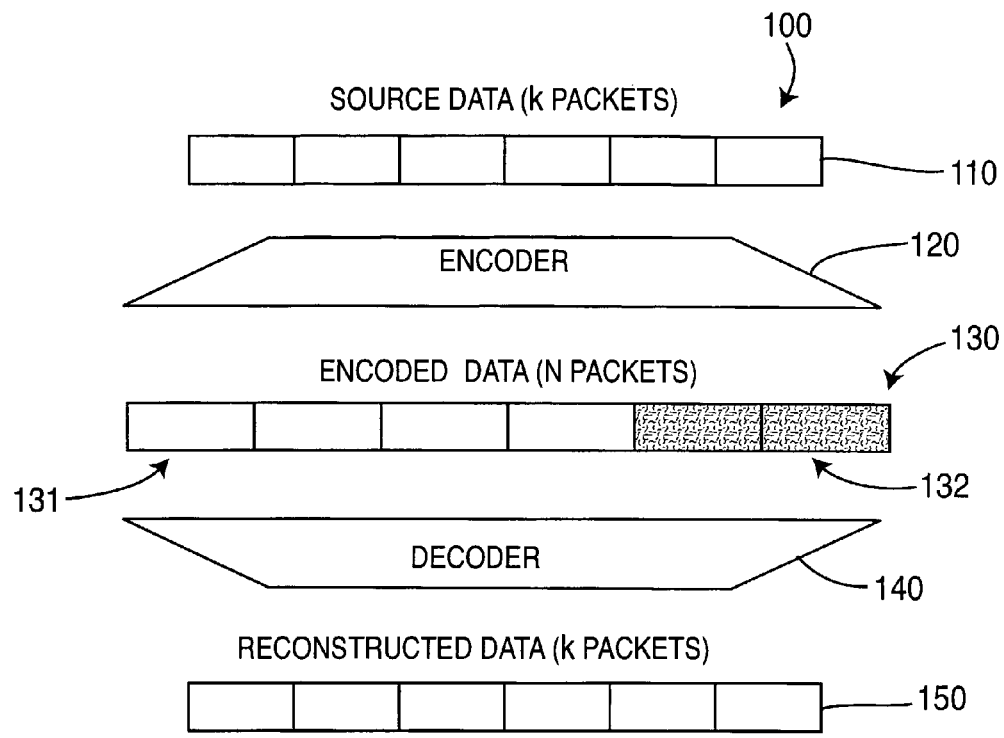
FIG. 1 shows a diagram for an exemplary encoding/decoding forward error correction (FEC) process to which the present invention may be applied.

The present invention is directed to adaptive forward error correction (FEC), in a preferred embodiment for video streaming over wireless networks. The present invention provides an adaptive FEC method and apparatus that improve video streaming performance by dynamically adjusting FEC strength based on network condition. The number of redundant packets that are transmitted over a wireless network is optimized based on network condition. A feedback signal is used to inform an adaptive FEC device at the sender side about network condition. The feedback signal can originate from, but is not limited to, the receiver, an intermediate node or the sender link layer. Monitoring network condition can be done at the sender side by accessing information from the sender wireless hardware such as retransmission attempts or by the use of Real-Time Control Protocol (RTCP) reports if RTP is used. The use of sender side information provides faster response to changes in network condition since RTCP reports are not sent frequently to conserve network resources. However, RTCP reports include more information and could be used to estimate available network bandwidth more accurately. A combination of feedback messages may also be used. Based on network condition, the adaptive FEC device decides how many redundant packets to send. If the network condition is poor, a larger number of redundant packets are sent than in the case when the network condition is satisfactory. It is to be appreciated that while the present invention is described with respect to packet-level erasure FEC, other types of packet level FEC may also be employed in accordance with the present invention while maintaining the spirit and scope of the present invention.

The instant description illustrates the principles of embodiments of the present invention. It will thus be appreciated that those skilled in the art will be able to devise various arrangements that, although not explicitly described or shown in the embodiments described herein, embody the principles of the invention and are included within its spirit and scope.

All examples and conditional language recited herein are intended for pedagogical purposes to aid the reader in understanding the principles of the invention and the concepts contributed by the inventor to furthering the art, and are to be construed as being without limitation to such specifically recited examples and conditions.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means that can provide those functionalities as equivalent to those shown herein.

Packet-level erasure FEC is used to improve the reliability of wireless links. Erasure is easier to deal with since the exact location of the error is known. An (n, k) erasure FEC scheme encodes k source packets into n (n>k) packets. The encoding is such that any subset consisting of k packets is sufficient to reconstruct the source data.

Turning to FIG. 1, an exemplary encoding/decoding FEC process is indicated generally by the reference numeral 100. Source packets (k original packets) 110 are input to the encoder 120, and n packets 130 are output by the encoder 120. The n packets 130 include encoded data corresponding to the k packets 131 as well as redundant packets 132 (i.e., the shaded blocks in FIG. 1). Interleaving across a number of FEC packets may be used to improve error correction performance over a number of FEC blocks. The decoder 140 decodes the n packets (which includes the original k packets 110 and the redundant packets) to obtain reconstructed data 150 (which is the same as the original k packets 110).

The packet loss rate of the wireless network fluctuates with time, network condition, network load, and so forth. Therefore, an adaptive forward error control scheme would be very useful to adjust the amount, of redundancy transmitted over the channel. A feedback-based adaptive forward error correction method and apparatus are provided. If network conditions are satisfactory, there is no need to send a large number of redundant packets. In contrast, when the packet drop rate is high (above a predetermined threshold), then more redundant packets are transmitted.

Figure 2:
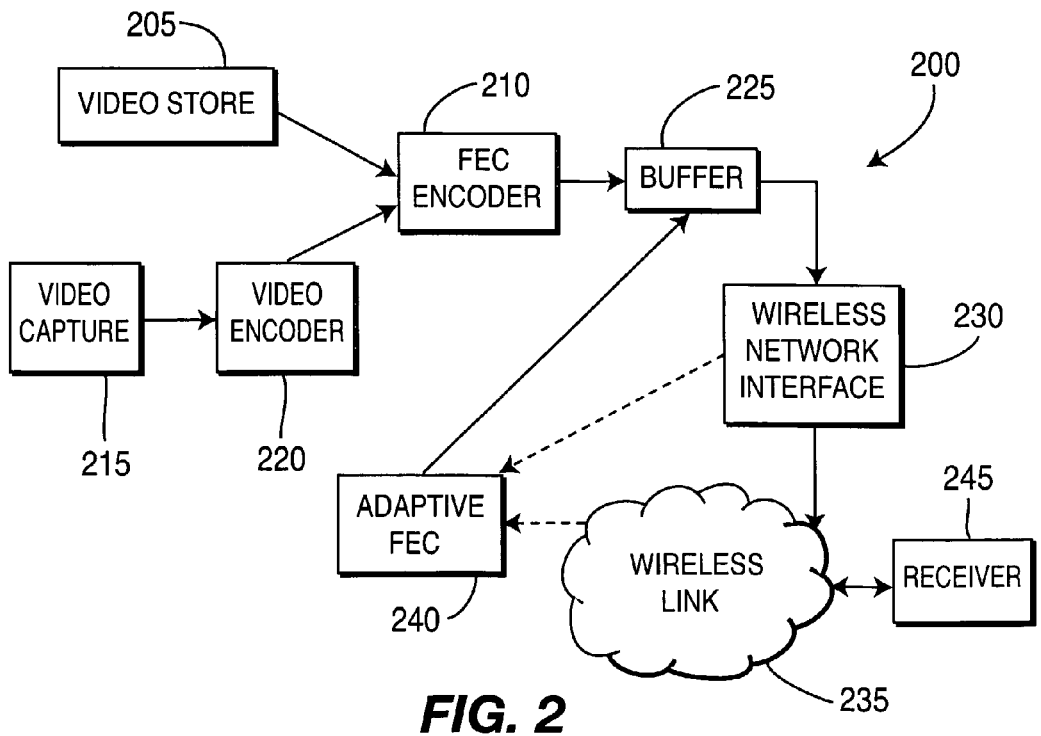
FIG. 2 shows a diagram for a typical wireless video system architecture to which the present invention may be applied.

Turning to FIG. 2, a typical wireless video system architecture is indicated generally by the reference numeral 200. The sender side (which includes elements (205, 210, 215, 220, 225, and 230) is the FEC protected video source, which may be stored or live content. The wireless video system architecture 200 includes a video store 205 having an output connected in signal communication with an input of an FEC encoder 210. Optionally, a video capture unit 215 having an output connected in signal communication with an input of a video encoder 220 that, in turn, includes an output connected in signal communication with the input of the FEC encoder 210, may be used in place of the video store 205. An output of the FEC encoder 210 is connected in signal communication with a first input of a buffer 225. An output of the buffer 225 is connected in signal communication with an input of a wireless network interface 230. A first output of the wireless network interface 230 is connected in signal communication with a wireless link (also referred to herein as a "wireless network") 235. A first and a second input of an adaptive FEC device 240 are respectively connected in signal communication with a second output of the wireless network interface 230 and with the wireless link 235. An output of the FEC device 240 is connected in signal communication with a second input of the buffer 225. A receiver 245 is connected in signal communication with the wireless link 235.

The sender side FEC encoder 210 encodes the packets. Each packet includes an integral number of macroblocks and has a fixed number of bytes. The sender side then packs the video data in Real-Time Protocol/User Datagram Protocol (RTP/UDP) before being passed onto the wireless network 235 via the wireless network interface 230.

The sender side transmits all the original packets all the time. The Adaptive FEC block decides the number of redundant packets to send based on one or more feedback messages (hereinafter "feedback message"). The feedback message could originate from the receiver side and is transmitted to the sender over RTCP or can be obtained from sender wireless retransmission information. The wireless retransmission information measures the number of times that a packet is retransmitted and could be used as an indicator of network condition. An effective adaptive approach could use both information with RTCP to provide more of a long term view of network condition while sender side information could be used to generate fast adaptation to network conditions.

The Adaptive FEC device 240 decides the number of packets to send based on the feedback message. Many alternative techniques can be used to determine the quantity of packets to send. For example, one embodiment of the present invention makes use of an increase/decrease function. In accordance with the principles of this embodiment, a "satisfactory" feedback message reduces the redundant packets to send by 1 to 0;

otherwise, the number of redundant packets is increased by 1 up to n−k packets. To have a good adaptation rate, a large value of n−k should be used.

In another alternative embodiment, an adjustment may be made using the RTCP receiver report. In particular, the fraction lost and the cumulative number of packets lost RTCP sender report fields can be used for adjustments. These fields represent the number of packets lost since the last receiver report and the total number of lost packets since the beginning of transmission, respectively.

Figure 3:
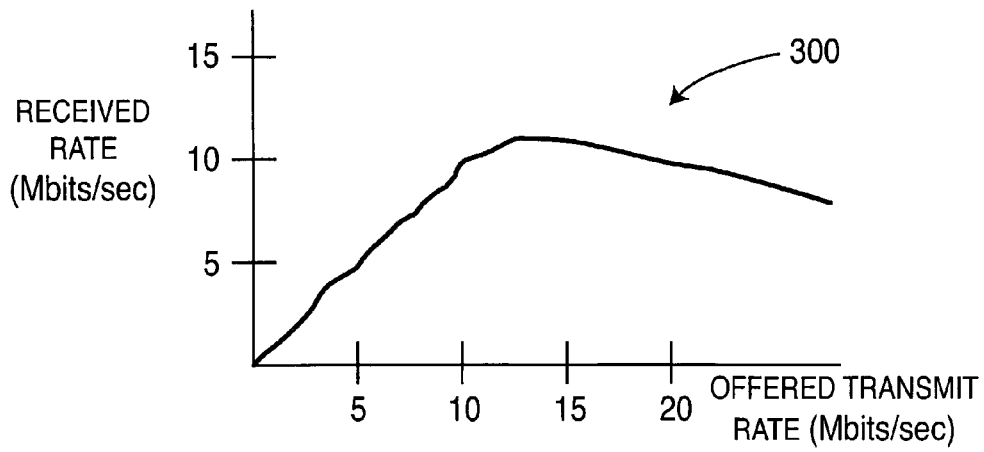
FIG. 3 shows a plot of received bit rate versus offered transmit rate for a WLAN link.

For many practical 802.11 Wireless Local Area Network (WLAN) links, the actual throughput levels off to a constant at some point and in some cases, actually goes down as the sending device tries to push more data through the link. This is illustrated in FIG. 3, wherein a plot of received bit rate versus offered transmit rate for a WLAN link is indicated generally by the reference numeral 300.

If a video transmitter (included in the wireless network interface 230) is sending data at a rate where the received rate increases as the offered transmit rate increases, then the FEC will improve the amount of information actually received. However, if the video transmitter is trying to send more data when it is operating on the portion of the curve that is flat, or worse yet decreasing, then the FEC will not help and may actually cause less video information to be received. For this reason, it is important for the video transmitter to have knowledge about what portion of the curve of FIG. 3 it is actually operating in. If it is operating in the decreasing portion of the curve, then it should not increase the amount of FEC data and should try to improve performance in some other way (e.g., reducing the bit rate) so that the operation goes to the increasing portion of the curve. If it is already operating on the increasing portion of the curve, then the video transmitter can add additional FEC information with good results.

One way for the video transmitter to know where it is at on the curve is to use feedback (e.g., an RTCP report) from the receiver 245 or the wireless sender retransmission information. If the video receiver 245 receives a lower packet rate once the FEC is added, then the transmitter is operating on the decreasing portion of the curve. If the receiver 245 receives a higher packet rate once the FEC is added, then the transmitter is operating on the increasing portion of the curve. This information would already be available to the video transmitter if it were already receiving information on the dropped packets through some feedback path. Alternatively, the Media Access Control (MAC)-level retransmission information from the wireless transmitter could be used to estimate the number of dropped packets as already described.

Figure 4:
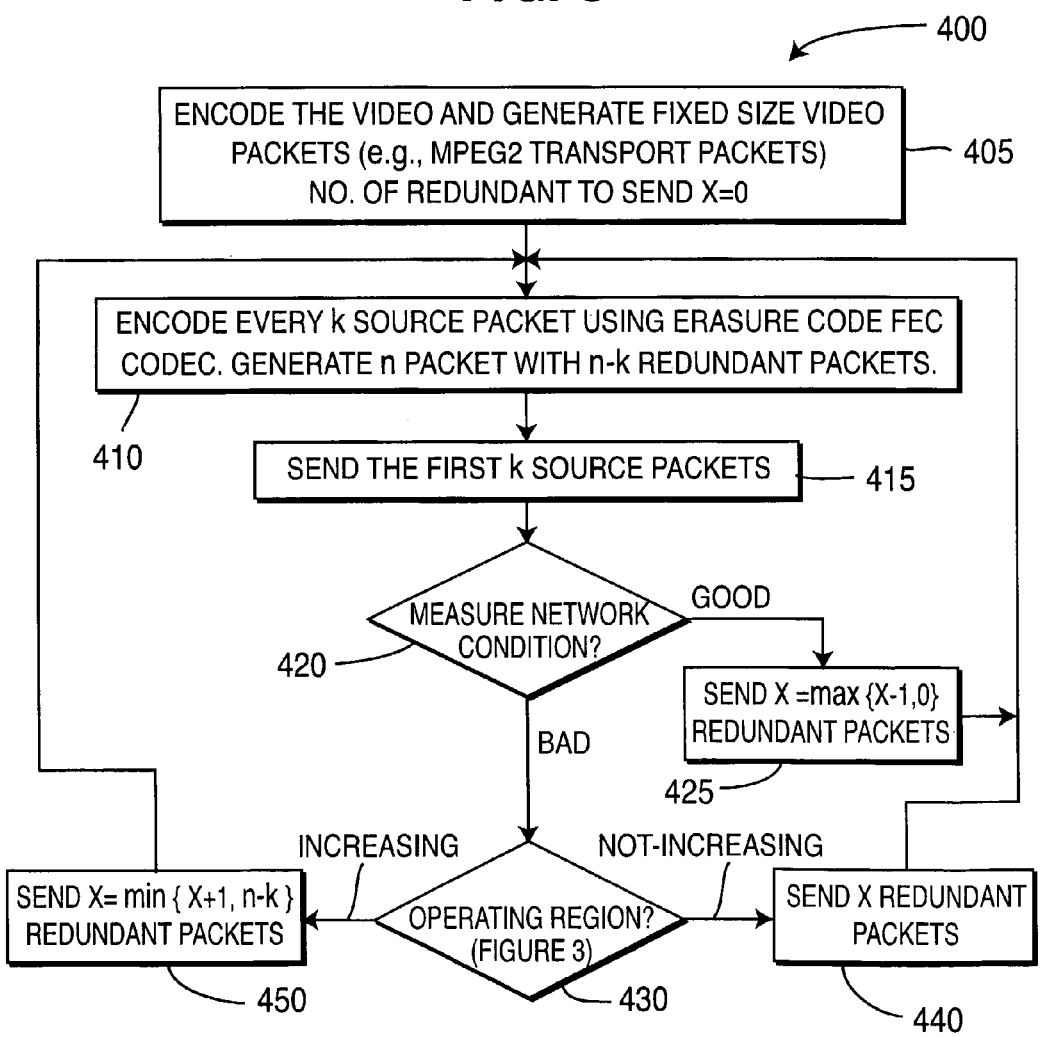
FIG. 4 shows a flow diagram for a method for adaptive FEC for video streaming over wireless networks in accordance with the principles of the present invention.

Turning to FIG. 4, a method for adaptive FEC for video streaming over wireless networks is indicated generally by the reference numeral 400.

A function block 405 encodes a video stream to generate fixed size video packets (e.g., MPEG2 transport packets), and passes control to a function block 410. At function block 405, the number of redundant packets to send (hereinafter also represented by the variable "X") is equal to zero (0).

The function block 410 encodes every k source packet using erasure code FEC to generate n packets with n−k redundant packets, and then passes control to a function block 415. The function block 415 sends the first k source packets, and passes control to a decision block 420. The decision block 420 measures and determines the network condition. If the network condition is good (i.e., above a pre-determined threshold), then control passes to a function block 425. Otherwise, if the network condition is bad (i.e., below the pre-determined threshold), then control passes to a decision block 430.

The function block 425 sends X=max {X−1, 0} redundant packets, and returns control to function block 410. That is, the function block 425 sends one less redundant packet than the number previously sent, down to a lower limit of zero redundant packets. The decision block 430 determines the operating region of the video transmitter with respect to received bit rate versus offered transmit rate (the curve shown in FIG. 3). In particular, the decision block 430 determines whether the transmitter is operating in an increasing region of the curve of FIG. 3 or in a non-increasing region of the curve. If the transmitter is operating in a non-increasing region of the curve, then control passes to a decision block 440 that sends X redundant packets, and passes control back to function block 410. Otherwise, if the transmitter is operating in an increasing region of the curve, then control passes to a function block 450 that sends X=min {X+1, n−k} redundant packets, and passes control back to the function block 410. That is, the function block 450 sends one more redundant packet than the number previously sent, up to an upper limit of (n−k) redundant packets. The returning to function block 410 by function blocks 425, 440, and 450 enables adaptation of the number of redundant packets sent based on the network condition.

These and other features and advantages of the present invention may be readily ascertained by one of ordinary skill in the pertinent art based on the teachings herein. It is to be understood that the teachings of the present invention may be implemented in various forms of hardware, software, firmware, special purpose processors, or combinations thereof.

Most preferably, the teachings of the present invention are implemented as a combination of hardware and software. Moreover, the software is preferably implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present invention is programmed. Given the teachings herein, one of ordinary skill in the pertinent art will be able to contemplate these and similar implementations, or configurations of the present invention.

Although the illustrative embodiments have been described herein with reference to the accompanying drawings, it is to be understood that the present invention is not limited to those precise embodiments, and that various changes and modifications may be effected therein by one of ordinary skill in the pertinent art without departing from the scope or spirit of the present invention. All such changes and modifications are intended to be included within the scope of the present invention as set forth in the appended claims.

The invention claimed is:

1. An apparatus comprising:
   an forward error correction encoder for encoding k packets of source data into n packets, where n>k, and the n packets include redundant data; and
   an FEC adaptive device, for adaptively determining the quantity of redundant data encoded along with the k packets of source data into n packets of encoded and redundant data, responsive to receiving at least one feedback message,
   wherein said FEC adaptive device determines the quantity of redundant data encoded along with the k packets of source data by estimating a number of dropped packets using retransmission information from a transmitter, the retransmission information specifically indicating a number of times that at least one of the n packets is retransmitted.

2. The apparatus as defined in claim 1, wherein at least one feedback message is indicative of the condition of a network over which said encoded and redundant data is to be transmitted.

3. The apparatus as defined in claim 2, wherein said network is a wireless network.

4. The apparatus as defined in claim 3, wherein said FEC adaptive device reduces the number of redundant packets by one down to a minimum of zero, when the at least one feedback message indicates a satisfactory condition of the wireless network.

5. The apparatus as defined in claim 3, wherein said FEC adaptive device increases the number of redundant packets by one up to a maximum of n–k packets, when the at least one feedback message indicates a non-satisfactory condition of the wireless network.

6. The apparatus as defined in claim 2, wherein said k packets of source data include, at least in part, video streaming data.

7. The apparatus as defined in claim 1, wherein said FEC adaptive device adapts the number of the redundant packets to transmit based on an increase/decrease function.

8. The apparatus as defined in claim 1, wherein the at least one feedback message comprises Real-Time Control Protocol (RTCP) receiver reports that specify a packet fraction lost and a cumulative number of packets lost.

9. The apparatus as defined in claim 2, wherein the condition of the network is determined with respect to a pre-determined threshold that is based on an actual received bit rate versus an offered for transmission bit rate.

10. The apparatus as defined in claim 9, wherein said FEC adaptive device increases the number of redundant packets to transmit when the actual received bit rate and the offered for transmission bit rate are both increasing.

11. The apparatus as defined in claim 1, the at least one feedback message corresponds to retransmission information at lower level layers of a wireless interface hardware.

12. The apparatus as defined in claim 1, wherein said FEC encoder (210) encodes the k packets of source data using erasure packet-level FEC.

13. A method for adaptive forward error correction (FEC) for video streaming over a wireless network, comprising the steps of:
   encoding k packets of source data into n packets, where n>k, and the n packets include source data derived from k packets along with redundant data; and
   adaptively determining the quantity of said n packets in which to transmit said source data derived from k packets and said redundant data, responsive to receiving at least one feedback message indicating a condition of the wireless network,
   wherein said determining step comprises estimating a number of dropped packets using retransmission information from a transmitter, the retransmission information specifically indicating a number of times that at least one of the n packets is retransmitted.

14. The method as defined in claim 13, wherein said step of actively determining comprises the step of adapting the number of the redundant packets to transmit based on an increase/decrease function.

15. The method as defined in claim 14, wherein said adapting step reduces the number of redundant packets by one down to a minimum of zero, when the at least one feedback message indicates a satisfactory condition of the wireless network, the satisfactory condition.

16. The method as defined in claim 14, wherein said adapting step increases the number of redundant packets by one up to a maximum of n–k packets, when the at least one feedback message indicates a non-satisfactory condition of the wireless network.

17. The method as defined in claim 13, wherein the at least one feedback message comprises Real-Time Control Protocol (RTCP) receiver reports that specify a packet fraction lost and a cumulative number of packets lost.

18. The method as defined in claim 13, wherein the condition of the network is determined with respect to a pre-determined threshold that is based on an actual received bit rate versus an offered for transmission bit rate.

19. The method as defined in claim 18, wherein said determining step increases the number of redundant packets to transmit when the actual received bit rate and the offered for transmission bit rate are both increasing.

20. The method as defined in claim 13, wherein the wireless network comprises wireless interface hardware, and the one or more feedback messages correspond to retransmission information at lower level layers of the wireless interface hardware.

21. The method as defined in claim 13, wherein said determining step comprises the step of prohibiting an increase of the number of redundant packets to transmit, when a lower packet rate is received than is transmitted of the encoded n packets.

22. The method as defined in claim 21, wherein said determining step comprises the step of reducing the number of redundant packets to transmit, when a lower packet rate is received than is transmitted of the encoded n packets.

23. The method as defined in claim 13, wherein said encoding step encodes the k packets of source data using erasure packet-level FEC.

24. A method of forward error correction (FEC) comprising:
   encoding k packets of source data and (n–k) packets of redundant data together to into n packets;
   determining the quantity of said n packets in which to transmit said source data and said redundant data, responsive to receiving at least one feedback message concerning status of a network over which said n packets are to be transmitted;
   determining whether a received rate, corresponding to an amount of the n packets received by a receiver, and an offered transmit rate, corresponding to an amount of the n packets offered for transmission by a transmitter, are both increasing, when the at least one feedback message indicates a non-satisfactory condition on the network;

increasing a quantity of the (n–k) packets of redundant data encoded with the k packets of source data, when the received rate and the offered transmit rate are both increasing; and decreasing the quantity of the (n–k) packets of redundant data encoded with the k packets of source data, when the received rate and the offered transmit rate are both substantially unchanging or decreasing.

25. An apparatus for forward error correction (FEC) comprising:

means for encoding k packets of source data and (n–k) packets of redundant data together to into n packets;

means for determining the quantity of said n packets in which to transmit said source data and said redundant data, responsive to receiving at least one feedback message concerning status of a network over which said n packets are to be transmitted;

means for determining whether a received rate, corresponding to an amount of the n packets received by a receiver, and an offered transmit rate, corresponding to an amount of the n packets offered for transmission by a transmitter, are both increasing, when the at least one feedback message indicates a non-satisfactory condition on the network;

means for increasing a quantity of the (n–k) packets of redundant data encoded with the k packets of source data, when the received rate and the offered transmit rate are both increasing; and means for decreasing the quantity of the (n–k) packets of redundant data encoded with the k packets of source data, when the received rate and the offered transmit rate are both substantially unchanging or decreasing.

* * * * *